March 15, 1966 R. F. DYE 3,240,830
SEPARATION OF INHIBITOR AND WATER FROM MONOMERIC MATERIALS
Filed May 4, 1962
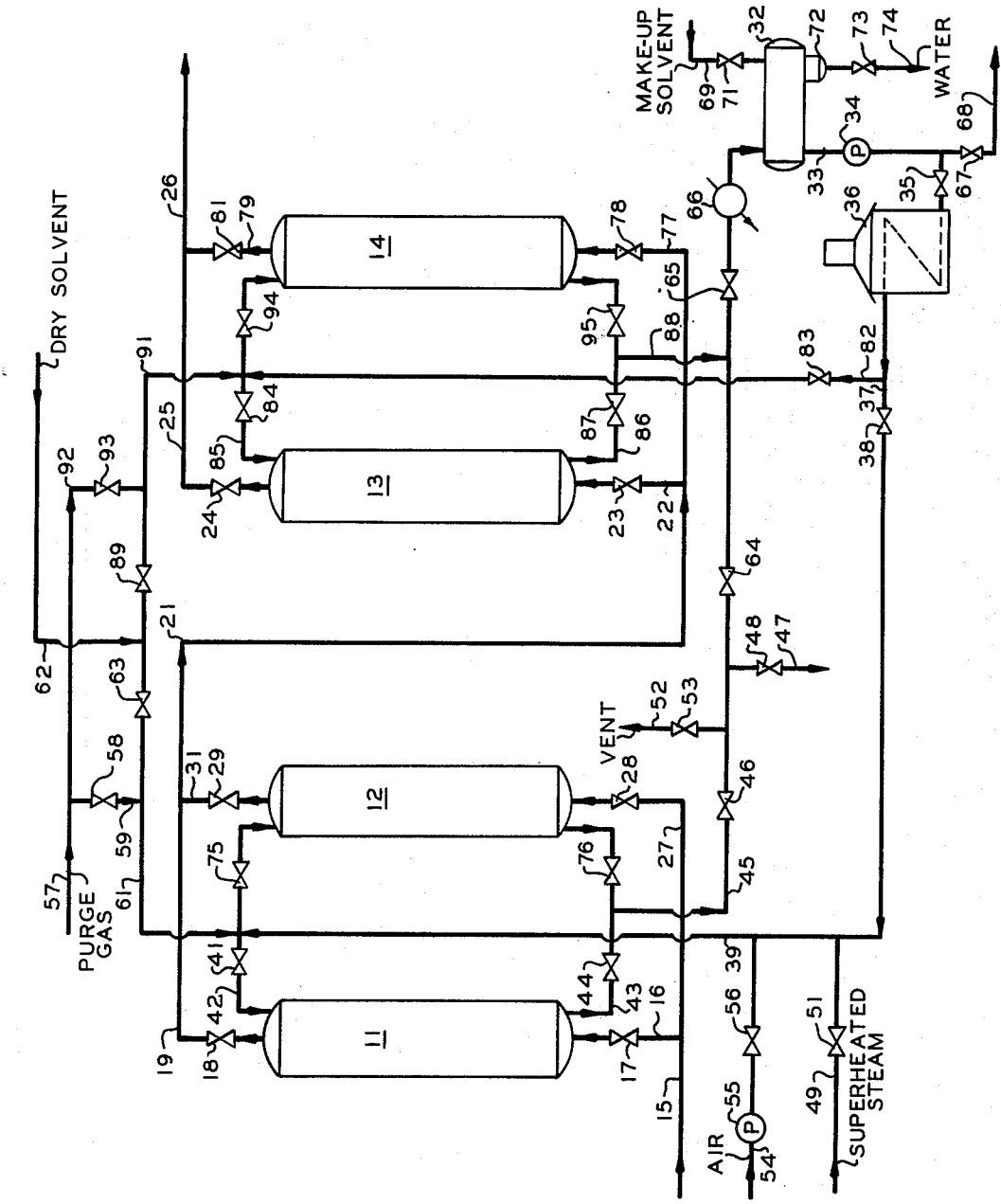
INVENTOR.
R.F. DYE
BY *Young + Quigg*
ATTORNEYS

United States Patent Office 3,240,830
Patented Mar. 15, 1966

3,240,830
SEPARATION OF INHIBITOR AND WATER FROM MONOMERIC MATERIALS
Robert F. Dye, Bartlesville, Okla., assignor to Phillips Petroleum Company, a corporation of Delaware
Filed May 4, 1962, Ser. No. 192,506
12 Claims. (Cl. 260—669)

This invention relates to method and apparatus for the separation of fluids. In one aspect the invention relates to the dehydration of fluids. In another aspect the invention relates to the removal of inhibitors from monomeric materials. In another aspect the invention relates to the removal of mono- and di-hydroxy substituted aromatic inhibitors from monomeric materials stabilized with said inhibitors. In yet another aspect the invention relates to method and apparatus for the removal of water and inhibitors from monomeric materials. In a still further aspect the invention relates to method and apparatus for the regeneration of used or spent desiccants. In another aspect the invention relates to the utilization of two desiccant beds for the removal of inhibitors and water from monomeric material, and the utilization of a separate regeneration process for each of said beds. In a still further aspect the invention relates to reducing the water content of a monomeric material below a predetermined value.

Monomeric materials such as styrene, conjugated dienes, heterocyclic nitrogen containing monomers, acrylic and methacrylic acid monomers and the like are known to polymerize to form elastomers, resins, liquid polymers, etc., depending upon the particular polymerization recipe and conditions. These monomeric materials are known to be more or less active at room temperatures even in the absence of catalyst, activators, etc. Since the monomeric material frequently is prepared at a point remote from the place of polymerization, the monomers must be stabilized for long periods of time, i.e., storage and transportation time. There are many known polymerization inhibitors which have been found to be useful to inhibit polymerization in one or more types of monomeric materials. That is, an inhibitor useful to prevent polymerization of conjugated dienes may be wholly ineffective as a polymerization inhibitor for vinylpyridines, or, on the other hand, the inhibitor may be useful for both of the materials but unsatisfactory for other monomeric materials, etc., There are two types of polymerization frequently encountered in the storage of monomers. First, there is the formation of soluble polymers or those polymers which are frequently preferred during the polymerization reaction. The second type of polymerization is frequently referred to as popcorn or proliferous polymerization wherein a highly crosslinked hydrocarbon insoluble polymer is formed. Here again, the success of an inhibitor against one type of polymer formation does not assure the usefulness of the inhibitor against the other type. The art has disclosed many of these inhibitors and has indicated their suitable application and it is not within the scope of this specification to disclose any specific uses for specific inhibitors. Among the inhibitors known to the art, the mono- and di-hydroxy substituted aromatic compounds have found wide application. Now before the monomers can be used, the inhibitor must be either removed, inactivated or otherwise counteracted. It is frequently preferred to remove the inhibitor and this is especially true in heterocyclic nitrogen containing monomers wherein a mono- or di-hydroxy substituted aromatic inhibitor has been used since frequently only very small amounts of inhibitor are effective. These inhibitors are frequently removed by distillation but since increasing temperatures increase polymerization activity, this method of separation is generally accompanied by the loss of monomers by polymerization. The distillation of a large volume of monomers is also expensive as compared to the method of this invention.

During the processing and storing of the monomeric materials it is common for traces of water to appear in the monomeric material. In many processes it is desirable that the water be completely removed from the monomeric material or reduced to less than a permissible value, such as, for example, 15 parts per million, as the presence of water can seriously affect the process.

Accordingly it is an object of the invention to separate inhibitors from monomeric materials. Another object of the invention is to effect the removal of water from monomeric materials. Yet another object of the invention is to provide method and apparatus for separating inhibitors and water from monomeric materials. A still further object of the invention is to provide method and apparatus for regenerating fluid separation means which has been utilized to separate inhibitors from monomeric materials. Yet another object of the invention is to provide method and apparatus for regenerating fluid separation means which has been utilized to separate water from monomeric materials. Another object of the invention is to provide method and apparatus for effecting an efficient separation of water and inhibitors from monomeric materials while at the same time providing efficient means for regenerating the separation apparatus.

Other aspects, objects and advantages of the invention will be apparent from a study of the disclosure, the drawings, and the appended claims to the invention.

In accordance with the invention inhibitors and water are removed from monomeric material by passing the monomeric material through a first separation zone to effect the removal of substantially all of the inhibitors and most of the water, passing the thus treated monomeric material through a second separation zone to effect the removal of substantially all of the remaining water, regenerating said first separation zone by burning, and regenerating said second separation zone by passing a vaporized solvent therethrough followed by passing liquid solvent through said second separation zone.

The method of this invention is applicable for removing the mono- and di-hydroxy substituted aromatic inhibitors from monomeric material broadly. While it is not within the scope of the invention to teach which inhibitors are effective to inhibit or retard either normal or proliferous polymerization in which monomers, the following monomeric materials can be mentioned to show the wide application of the invention. Such monomers include carboxy-containing monomers such as acrylic acid; and beta alkyl-substituted derivatives in which the alkyl group contains from one to eight carbon atoms such as methacrylic acid, alpha ethyl-, propyl-, butyl-, amyl-, hexyl-, heptyl-, and octyl-acrylic acids, phenylacrylic acid, vinylacrylic acids; heterocyclic nitrogen containing monomers such as pyridine and quinoline derivatives containing at least one vinyl or alpha-methylvinyl- (isopropyl) groups such as 2-vinylpyridine, 3-vinylpyridine, 4-vinylpyridine, 2,4,6-trimethyl-5-vinylpyridine, 3,4, 5,6-tetramethyl-2-vinylpyridine, 3-ethyl-5-vinylpyridine, 2-methyl-5-vinylpyridine, 2,6-diethyl-4-vinylpyridine, 2-isopropyl - 4 - nonyl - 5 - vinylpyridine, 2 - methyl - 5- undecyl - 6 - vinylpyridine, 3,5 - di(alpha - methylvinyl) pyridine, similar mono- and di-substituted alkene, pyridines and like quinolines; styrene, alpha-methyl styrenes and various alkyl substituted styrenes, aminostyrene, alkyl-aminostyrene, dialkylaminostyrene such as 2(N,N-dimethylamino)styrene, 3,4 - diethyl 2 - amino - styrene, methylethylaminostyrene, dipropylaminostyrene, methylpropylaminostyrene; the corresponding amino-, alkylamino-, and dialkylamino-alphamethylstyrene; acrylonitrile; methacrylonitrile; acrylates such as methyl acrylate, ethyl acrylate, and methyl methacrylate; amino-, alkylamino-, and dialkylamino-acrylates such as aminoethyl acrylate, methylaminoethyl acrylate, methylethylamino acrylate, etc., and the corresponding amino-, alkyl amino-, and dialkylaminomethacrylates; vinyl chloride; vinylidene chloride; vinylacetate; methyl vinyl ketone; methyl isopropenyl ketone; methyl vinyl ether; conjugated dienes such as 1,3-butadiene, isoprene, piperylene, methylpentadiene, 2,3-dimethyl-1,3-butadiene, chloroprene, etc.; various alkoxy such as methoxy and ethoxy and cyano derivatives or conjugated dienes such as 2-methoxybutadiene and 1-cyanobutadiene; vinylcarbazone, vinylpyrrole, vinylmorpholine, etc.; and divinyl compounds such as 2,4-divinylpyridine, 2,3-divinylpyridine, 3,5-divinylpyridine, 2,4-divinyl-6-methylpyridine, 2,3-divinyl-5-ethylpyridine, 2,5-divinylquinoline, 2,5-divinyl-6-methylquinoline, 2,4-divinyl-5-ethylquinoline and the like.

The above list of monomers is intended in no way to be exhaustive but merely illustrates the wide variety of monomers to which the method of this invention is applicable.

As has been indicated, the method of this invention is useful for removing those inhibitors which are derivatives of mono- and di-hydroxy as substituted aromatic compounds from monomeric material. Examples of such compounds which can be separated from monomers by the method of this invention include para-tert-butyl catechol, ortho-amino-phenol, various nitro-substituted phenols such as 2,6-dinitro-4-chlorophenol, 2,4-dinitro-6-chlorophenol, 2,6-dinitro-3-chlorophenol, and 2,5-dinitro-4-chlorophenol; 3,4-diaminophenol hydrochloride; aminothiophenol; o-hydroxybenzyl alcohol, alpha naphthol, beta-di-naphthol, p-bromophenol, 5-methyl-1,3-benzenediol, p-phenyl phenol, pentachlorophenol, 2,4,6-tribromophenol, 2,4,6-trichlorophenol pyrogallol, n-butylpyrogallol, 1,4-dihydroxyanthraquinone, 2,4-dihydroxy-acetophenone, resorcinol, phenyl-o-hydroxybenzoic acids, 1,4-dihydroxybenzene, 2-chloro-5-hydroxytoluene, 2-amino-5-hydroxytoluene, 2,4-dinitro-1-naphthol, m-aminophenol, p-aminophenol, 2-amino-5-nitrophenol, dibenzyl-n-aminophenol, o-nitrophenol, dinitroresorcinol, and sodium nitroresorcinol.

The above list of compounds is typical of the compounds of the classes of materials taught by the art to be inhibitors. While we do not say that all of these compounds are effective inhibitors, we do say that these compounds when so used can be removed by the process of this invention.

Referring now to the drawing there is shown a schematic representation of a fluid separation system in accordance with the invention, comprising first stage purification columns 11 and 12 and second stage purification columns 13 and 14. While it is obvious that each of the first and second stages can comprise one or more purification columns in parallel, and that when a stage comprises two or more columns one or more of the columns of that stage can be placed on stream while the remainder are being regenerated, for purposes of simplicity the invention will be described in terms of each stage containing two columns with one being on stream while the other is being regenerated. A feed stream comprising monomeric material, inhibitor and water is passed from a source (not shown) through line 15, line 16 and valve 17 into first stage purification column 11, wherein substantially all of the inhibitor and a large portion of the water is separated out and retained on the adsorbent material contained in column 11.

The partially purified fluid from purification column 11 is withdrawn through valve 18 and passed through lines 19, 21 and 22 and valve 23 into a second stage purification column 13 wherein substantially all of the remaining water is separated out and retained on the adsorbent material contained in column 13. The purified fluid from purification cloumn 13 is withdrawn through valve 24 and passed through lines 25 and 26 to storage or point of utilization.

The adsorbent material in columns 11, 12, 13 and 14 can be any suitable material. An adsorbent material useful for removing an inhibitor of the class defined comprises alumina, inorganic alkali salts or alumina as the aluminate or mixture of the two. Alumina commercially available contains at least a finite amount of aluminate and the aluminate can run as high as one or even two percent. In general, the aluminate is present as the sodium or potassium salt. Commercial alumina is frequently prepared from an alumina such as bauxite by caustic washing followed by water washing and the resulting material dried or even calsined. All such commercially prepared aluminas will contain a finite amount of the alkali metal aluminate. While the alumina or aluminas are generally in the size range of 10 to 400 mesh, alumina having a mesh size in a range of 20 to 60 is especially effective. Other suitable absorbent materials include silica gel, molecular sieves, and activated charcoal.

The number of volumes of inhibited monomers which can be treated by a given volume of a particular adsorbent will be dependent upon the concentration of inhibitors in the monomers and upon the particular inhibitor. That is, a larger volume of monomers having a low inhibitor content can be treated than can monomers having a high inhibitor content. Both the alumina and the aluminates are effective inhibitor removers. However, we have found that those mono- and di-hydroxy substituted aromatic inhibitors having no further substitution or further substituted only by hydrocarbons such as tert-butyl catechol (TBC) are removed in greater quantities by the aluminates than by the alumina. That is, a given volume of aluminate will remove inhibitor from a greater volume of monomers containing a given concentration of such inhibitors than will an equal volume of alumina. On the other hand, inhibitors such as ortho-amino-phenol (OAP) are as effectively removed by alumina as by the aluminate.

When a first stage purification column is first placed on stream, substantially all of the inhibitor and substantially all of the water contained in the feed stream will be adsorbed by the adsorbent material contained therein. After the first stage purification column has been in operation for some time and has acquired a considerable amount of water, any water not removed in the first stage purification column will pass to a second stage purification column and be removed therein. However, as the adsorbent material is generally selective with a preference for the inhibitor over water, additional amounts of inhibitor in the feed stream to the first stage purification column will displace adsorbed water and be retained in the first stage purification column.

When the saturation of first stage purification column 11 reaches a predetermined level, valves 17 and 18 are closed and the feed stream in line 15 is passed through line 27 and valve 28 into first stage purification column 12. The effluent from column 12 is withdrawn through valve 29 and line 31 and passed through line 21 to a second stage purification column. The monomer remaining in column 11 is removed by gravity or force feed and can be returned to the source of the feed stream. A suitable solvent for the monomer, such as hexane, is withdrawn from accumulator 32 and passed by way of line 33, pump 34 and valve 35 to heat exchanging means 36, such as a furnace, wherein the solvent is heated to a suitable temperature such as on the order of 200° F. The thus heated solvent is then passed through line 37, valve 38, line 39, valve 41 and line 42 into column 11 at a suitable rate, such as the order of about 1 to about 2 gallons per minute, and for a sufficient time, such as in the order of 30 minutes, to remove any remaining monomer contained in column 11. The solvent containing the monomer is withdrawn from column 11 by way of line 43 and valve 44 and passed through line 45 and valve 46 to be withdrawn from the system by way of line 47 and valve 48. The solvent containing the monomer can be passed to a solvent recovery process and/or monomer recovery process or passed to a point of disposal.

Column 11 is then preheated to a suitable temperature, such as on the order of 500–700° F. by the passage of superheated steam through line 49 and valve 51 into line 39 and then through valve 41 and line 42 into column 11. The spent stream is withdrawn from column 11 by way of line 43 and valve 44 and passed to vent 52 by way of line 45 and valves 46 and 53. When the desired temperature in column 11 has been attained, compressed air is passed by way of line 54, pump 55 and valve 56 into line 39 wherein the compressed air is mixed with steam from line 49. The air-steam mixture is then passed through valve 41 and line 42 into column 11 to cause burnoff of the inhibitor adsorbed therein. The flow of steam is continued primarily for the purpose of maintaining temperature stability in column 11 and thereby prevent overheating of the adsorbent material.

When the burnoff of the inhibitor is complete or has proceeded to a predetermined point, the flow of air and steam is discontinued, and a purge gas, such as nitrogen, is passed through line 57, valve 58, lines 59 and 61, valve 41 and line 42 into column 11 to remove any remaining combustion products and/or steam. The effluent from the purging procedure can be passed to vent 52. After column 11 has been purged, dry solvent is passed through line 62, valve 63, line 61, valve 41 and line 42 into column 11 to cool the adsorbent material contained therein to a suitable operating temperature, such as on the order of about 100° F. to about 125° F. The used solvent is withdrawn from column by way of line 43 and valve 44 and passed to accumulator 32 by way of line 45, valves 46, 64 and 65 and condenser 66. Excess solvent can be withdrawn from accumulator 32 by way of line 33, pump 34, valve 67 and line 68 to storage or point of utilization. Make-up solvent can be added to accumulator 32 by way of line 69 and valve 71, as desired. Water contained in the solvent can be withdrawn through phase separator 72, valve 73 and line 74.

Solvent remaining in column 11 can be removed by the introduction of purge gas from line 57. It is desirable that the adsorbent material be left wet with solvent as the heat of adsorption during the initial wetting of the adsorbent material is often sufficiently high to cause thermal polymerization of the monomer in the feed stream.

When it is desired to regenerate column 12, the same procedure is followed as for column 11 except that valve 75 is opened instead of valve 41 and valve 76 is opened instead of valve 44.

When the saturation of second stage purification column 13 reaches a predetermined level, valves 23 and 24 are closed and the feed stream in line 21 is passed through line 77 and valve 78 into second stage purification column 14. The effluent from column 14 is withdrawn through valve 81 and line 79 and introduced into line 26. The monomer remaining in column 13 is removed by gravity or force feed and can be returned to the source of the feed stream. Solvent is withdrawn from accumulator 32 and passed by way of line 33, pump 34 and valve 35 to heat exchanging means 36 wherein the solvent is headed to a suitable temperature such as on the order of 200° F. The thus heated solvent is then passed through line 82, valve 83, valve 84 and line 85 into column 13 at a suitable rate, such as on the order of about 1 to about 2 gallons per minute, and for a sufficient time, such as on the order of 30 minutes, to remove part of the water contained in column 13. The solvent containing the water is withdrawn from column 13 by way of line 86 and valve 87 and passed through line 88 and valve 64 to be withdrawn from the system by way of line 47 and valve 48. The solvent containing the water can be passed to a solvent recovery process or passed to a point of disposal or recycled to the source of the monomer, inhibitor and water stream.

Heat exchanging means 36 is then changed to produce vaporized solvent at a suitable temperature, such as on the order of 550° F. to 750° F. The vaporized solvent is passed through line 82, valves 83 and 84 and line 85 into column 13 to remove the last traces of the water in column 13. The vaporized solvent is withdrawn from column 13 by way of line 86, valve 87 and line 88 and passed through valve 65 and condenser 66 into accumulator 32.

When the regeneration of column 13 is complete or has proceeded to a predetermined point, the flow of vaporized solvent is discontinued and dry solvent is passed through line 62, valve 89, line 91, valve 84 and line 85 into column 13 to cool the adsorbent material contained therein to a suitable operating temperature, such as on the order of about 100° F. to about 125° F. The used solvent is withdrawn from column 13 by way of line 86 and valve 87 and passed to accumulator 32 by way of line 88, valve 65 and condenser 66.

Solvent remaining in column 13 can be removed by the introduction of purge gas from line 57 through line 92, valve 93, line 91, valve 84 and line 85. Again it is desirable that the adsorbent material be left wet with solvent as the heat of adsorption during the initial wetting of the adsorbent material is often sufficiently high to cause thermal polymerization of the monomer in the feed stream.

When it is desired to regenerate column 14, the same procedure is followed as for column 13 except that valve 94 is opened instead of valve 84 and valve 95 is opened instead of valve 87.

While the regeneration of the second stage purification columns has been described as utilizing a solvent for the monomer, any suitable fluid having a temperature greater than the boiling point of water in the second stage purification column and which would not contaminate either the adsorbent material or the monomer feed stream can be utilized.

The utilization of air and steam in the regeneration of the first stage purification columns makes possible the removal of the inhibitor adsorbed in the first stage purification columns by burning off the inhibitor, whereas the utilization of the vaporized solvent in the regeneration of the second stage purification columns enables the water content of the second stage purification columns to be reduced to a point less than that obtainable with the regeneration procedure used for the regeneration of the first stage purification columns.

The following specific example is presented in further illustration of the invention, but is not to be construed in limitation of the invention.

Table 1

| Stream No. | 15 | 21 | 26 | 49[1] | 54[1] | 82[1] |
|---|---|---|---|---|---|---|
| Styrene, #/hr | 2,250 | 2,250 | 2,250 | | | |
| TBC, p.p.m | 10 | | (¹) | | | |
| Water, #/hr | 2 | .5 | (²) | 3,000 | | |
| Hexane, #/hr | | | | | | 2,250 |
| Air, #/hr | | | | | 940 | |

[1] The values for streams 49, 54, and 82 are shown to illustrate regeneration rates only and are not related to the continuous flow valves of streams 15, 21, and 26.
[2] Negligible.

As noted above, the drawing is merely diagrammatic and is not intended to fully show all component parts of the equipment which one skilled in the art will routinely design for the operation. Indeed, the showing of an element or piece of equipment does not means that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. Suffice to say, the drawing is for illustrative purposes, as is the description thereof.

Reasonable variation and modification are possible within the scope of the foregoing disclosure, the drawing and the appended claims to the invention.

I claim:

1. A method of treating a monomeric material containing water and an inhibitor to reduce the amount of water and inhibitor in said monomeric material, comprising passing said monomeric material containing water and inhibitor through a first adsorption zone to effect the removal of substantially all of said inhibitor and part of said water, passing the thus treated monomeric material through a second adsorption zone to effect the removal of substantially all of the water remaining in said thus treated monomeric material, regenerating said first adsorption zone by burning any material adsorbed therein, and regenerating said second adsorption zone by passing a heated fluid therethrough having a temperature above the boiling point of water.

2. A method in accordance with claim 1 wherein said monomeric material is styrene and said inhibitor is tert-butyl catechol.

3. A method in accordance with claim 1 wherein the adsorbent material in said first and second adsorption zones is a compound of aluminum selected from the group consisting of refined alumina containing alkali metal aluminate and alkali metal aluminates.

4. A method in accordance with claim 3 wherein said adsorbent material has a particle size in the range of about 10 to about 400 mesh size.

5. A method in accordance with claim 3 wherein said adsorbent material has a particle size in the range of about 20 to about 60 mesh size.

6. A method of treating a monomeric material containing water and an inhibiting amount of an inhibitor to reduce the concentration of water and inhibitor in said monomeric material, comprising passing said monomeric material containing water and inhiibtor through a first adsorption zone to effect the removal of substantially all of said inhibitor and part of said water, passing the thus treated monomeric material through a second adsorption zone to effect the removal of substantially all of the water remaining in said thus treated monomeric material; regenerating said first adsorption zone by ceasing the flow of said monomeric material containing water and inhibitor therethrough, removing any remaining monomeric material contained in said first adsorption zone by passing a hot solvent for the monomer therethrough, preheating the adsorbent material contained in said first adsorption zone, passing air through said first adsorption zone and in contact with the thus preheated adsorption material contained therein to thereby burn any inhibitor adsorbed in said first adsorption zone, purging said first adsorption zone with a purge gas to remove any remaining combustion products contained therein, cooling the adsorbent material contained in the thus purged first adsorption zone by passing cool dry solvent in direct heat exchanging relationship therewith, removing excess solvent from the thus cooled first adsorption zone by passing purging gas therethrough; and regenerating said second adsorption zone by ceasing the flow of said thus treated monomeric material therethrough, removing any remaining monomeric material contained in said second adsorption zone by passing a hot solvent therethrough, passing vaporized solvent through said second adsorption zone to remove any water remaining therein, cooling the adsorbent material in said second adsorption zone by passing cool dry solvent in direct heat exchanging relationship therewith, and removing excess solvent from the thus cooled second adsorption zone by passing purging gas therethrough.

7. A method in accordance with claim 6 wherein said monomeric material is styrene, said inhibitor is tert-butyl catechol, and said solvent is hexane.

8. A method in accordance with claim 6 wherein the step of preheating the adsorbent material contained in said first adsorption zone comprises passing superheated steam in direct heat exchanging relationship therewith to raise the temperature of said adsorbent material contained in said first adsorption zone to a value in the range of about 500° F. to about 700° F.

9. A method in accordance with claim 6 wherein said vaporized solvent is at a temperature in the range of about 550° F. to about 750° F.

10. A method in accordance with claim 6 wherein the adsorbent material in said first and second adsorption zones is a compound of aluminum selected from the group consisting of refined alumina containing alkali metal aluminate and alkali metal aluminates.

11. A method in accordance with claim 10 wherein said adsorbent material has a particle size in the range of about 10 to about 400 mesh size.

12. A method in accordance with claim 6 wherein said first and second adsorption zones comprise first and second plurality of adsorption zones, respectively, and the step of regenerating said first adsorption zone is carried out for at least one of said first plurality of adsorption zones while the remainder of said first plurality of adsorption zones is on stream, and the step of regenerating said second adsorption zone is carried out for at least one of said second plurality of adsorption zones while the remainder of said second plurality of adsorption zones is on stream.

References Cited by the Examiner

UNITED STATES PATENTS

| | | | |
|---|---|---|---|
| 2,826,581 | 3/1958 | Mahan et al. | 260—674 |
| 2,950,336 | 8/1960 | Kimberlin et al. | 260—674 |

OTHER REFERENCES

Capell et al.: Chem. and Met. Eng., vol. 50, No. 7, pp. 107–110 (1943).

DELBERT E. GANTZ, *Primary Examiner.*

ALPHONSO D. SULLIVAN, *Examiner.*